(12) United States Patent
Parviainen

(10) Patent No.: US 6,959,316 B2
(45) Date of Patent: Oct. 25, 2005

(54) DYNAMICALLY CONFIGURABLE PROCESSOR

(75) Inventor: Jari A. Parviainen, Jaali (FI)

(73) Assignee: Nokia Mobile Phones Limited, Espoo (FI)

( * ) Notice: Subject to any disclaimer, the term of this patent is extended or adjusted under 35 U.S.C. 154(b) by 596 days.

(21) Appl. No.: 09/726,188

(22) Filed: Nov. 29, 2000

(65) Prior Publication Data

US 2002/0103841 A1 Aug. 1, 2002

(51) Int. Cl.$^7$ ............................................. G06F 7/52
(52) U.S. Cl. ..................................... 708/620; 705/625
(58) Field of Search ............................... 708/201, 578, 708/230, 500–523, 620–632

(56) References Cited

U.S. PATENT DOCUMENTS

| | | | |
|---|---|---|---|
| 4,839,851 A | | 6/1989 | Maki |
| 5,301,137 A | * | 4/1994 | Matsuo et al. ............... 708/501 |
| 5,390,135 A | * | 2/1995 | Lee et al. .................... 708/518 |
| 5,570,039 A | * | 10/1996 | Oswald et al. ................. 326/39 |
| 5,805,477 A | * | 9/1998 | Perner ........................ 708/232 |
| 5,898,602 A | * | 4/1999 | Rothman et al. ........... 708/230 |
| 5,974,435 A | | 10/1999 | Abbott |
| 6,006,321 A | | 12/1999 | Abbott |
| 6,369,610 B1 | * | 4/2002 | Cheung et al. ............. 708/505 |
| 6,377,970 B1 | * | 4/2002 | Abdallah et al. ........... 708/603 |
| 6,480,872 B1 | * | 11/2002 | Choquette ................... 708/501 |
| 6,574,651 B1 | * | 6/2003 | Cui et al. .................... 708/523 |
| 6,601,077 B1 | * | 7/2003 | Aldrich et al. .............. 708/201 |
| 6,628,140 B2 | * | 9/2003 | Langhammer et al. ........ 326/40 |

FOREIGN PATENT DOCUMENTS

| | | |
|---|---|---|
| EP | 0 833 244 A1 | 4/1998 |
| EP | 0 924 625 A1 | 6/1999 |

OTHER PUBLICATIONS

Simon et al., A Reconfigurable Multiplier Array for Video Image Processing Tasks Suitable for Embedding in an FPGA Structure, Apr. 1998, IEEE, pp. 226-234.*
Sangjin et al., Reconfigurable Embedded MAC Core Design for Low-power Coarse-grain FPGA, Apr. 2003, IEEE, vol. 39 No. 7, pp. 606-608.*
EDN 2000, DSP Architecture Directory, by Markus Levy, Technical Editor, Mar. 30, 2000, pp. 60-98.
TMS320C6000 CPU and Intruction Set Reference Guide, Texas Instruments, pp. 2-1 through 2-33 and 3-78 through 3-86.

* cited by examiner

*Primary Examiner*—Kakali Chaki
*Assistant Examiner*—Chat C. Do
(74) *Attorney, Agent, or Firm*—Harrington & Smith, LLP

(57) ABSTRACT

A data processor, such as a DSP, includes a multiplier block having a multiplier front end for generating partial products from input operands, and further includes a plurality of ALUs having inputs that are switchably or programmably coupled, in a first mode of operation, to first data sources representing outputs of the multiplier front end. In the first mode of operation the ALUs add together partial products received from the multiplier front end to arrive at a multiplication result. In a second mode of operation the inputs of the plurality of ALUs are switchably or programmably coupled to second data sources for performing at least one of arithmetic and logical operations on data received from the second data sources.

19 Claims, 7 Drawing Sheets

DYNAMICALLY CONFIGURABLE PROCESSOR

FIELD OF THE INVENTION

This invention relates generally to data processors and, more particularly, to data processors having processing resources or elements that can be selectively switched between at least two configurations.

BACKGROUND OF THE INVENTION

Modern digital data processors, such as Digital Signal Processors (DSPs), are being applied in numerous different types of applications, including broadband communications, medical-imaging equipment, modems, audio equipment, motor control and others. One important application that is of most interest to the teachings of this invention is in the field of wireless telecommunications, such as cellular telephones and personal communications, referred to herein generally as wireless terminals. Other applications of interest include base stations for wireless terminals, as well as internet computing.

One approach to designing a modern wireless terminal is to employ application specific integrated circuit (ASIC) technology and/or Field Programmable Gate Array (FPGA) technology. In the ASIC approach the required circuit blocks are embedded within one or more custom designed ASIC packages. However, the ASIC approach generally requires significant design and manufacturing lead times. Furthermore, once the design(s) are committed to circuits subsequent changes become difficult or impossible to make in a rapid and cost-effective manner. The FPGA approach, while somewhat more flexible than the use of ASICs, is generally a "fine-grained" solution that enables reprogramming for certain circuit blocks. While the fine-grained nature of the FPGA makes it flexible and programmable, this is achieved at the cost of high silicon overhead, which can be a disadvantage in cost-sensitive applications.

To avoid or at least reduce the risk inherent in the ASIC and FPGA (high cost) approaches many designers prefer to use the DSP approach, wherein one of a number of commercially available DSPs is selected based on some criteria. Once selected, the design task becomes primarily one of programming the DSP, for a typical wireless terminal application, to perform the required functions, such as filtering and Viterbi decoding. If subsequent changes in design are required then, ideally, the changes are limited to software (firmware) revisions, and do not impact any physical circuit (s).

There are a number of commercially available DSPs that are currently marketed by a various integrated circuit manufacturers. One current list can be found in an article by Marcus Levy entitled "DSP-architecture directory", EDN, Mar. 30, 2000, pgs. 60–96.

One drawback to the use of DSPs is that most are designed to provide an overall functionality that is applicable to a number of different types of applications. Because of this generality, no one specific DSP may be ideally suited for a specific application. For example, a DSP that is designed so as to serve both the audio reproduction and the motor control markets may not be ideally suited for use by either, requiring some tradeoffs in performance and ease of use.

It is known in modern DSPs to provide certain processing resources or elements that can be selectively utilized in more than one way. For example, the TMS320C5000™ DSP that is available from Texas Instruments provides an Arithmetic Logic Unit (ALU) that can be used to operate on 32-bit data or split to perform dual 16-bit operations. A C54x version of this DSP provides a 40-bit adder at the output of a multiplier to enable unpipelined Multiply and Accumulate (MAC) operations, as well as dual addition and multiplication in parallel.

A REAL™ DSP available from Philips Semiconductor features a dual Harvard architecture with two 16-bit data buses connected to a data-computation unit (DCU). Each ALU in the DCU operates on 32-bit data and eight overflow bits and stores the results in four, 40-bit accumulators. A feature of this DSP is that each 32-bit ALU may be split into two 16-bit ALUs.

Another DSP available from Texas Instruments (TMS320C6000™) lacks a dedicated MAC unit, and instead performs MAC operations by using separate multiply and add instructions. The architecture of this DSP includes dual datapaths and dual matching sets of four functional units. The total of eight functional units include two multiply (M) units and six 32-bit arithmetic units with a 40-bit ALU and a 40-bit barrel shifter. The multiply units can perform two 16×16-bit multiplies every clock cycle, or four 8X8-bit multiples.

The TigerSharc™ DSP available from Analog Devices provides two computation blocks enabling two 32×32-bit MACs per cycle or, when operating on 16-bit data, eight 16×16-bit MACs per cycle. Each computation block includes a register file of 32, 32-bit registers that are combinable (two 32-bit registers to form one 64-bit register, or four 32-bit registers to form a single 128-bit destination register for the multipliers).

Finally, Module Research Center provides a NeuroMatrix™ NM6403™ DSP having a 32-bit Reduced Instruction Set (RISC) core and a 64-bit Vector coprocessor. In this DSP the number of MACs per processor cycle depends on the length and number of words packed into a 64-bit block, and the configuration of the engine can change dynamically during calculations. That is, an application can be started with maximum precision and minimum performance, and the performance can then be dynamically increased by reducing data-word lengths.

From the foregoing non-exhaustive list of currently available DSPs it can be appreciated that a certain level of flexibility has been provided to more efficiently use the resources of the DSP. For example, multipliers and ALUs can be split and registers can be combined depending on the length of data-words being operated upon. An ability to dynamically change data-word length is also currently possible to achieve.

A trend is also developing to provide DSP users with an ability to design their own DSPs using DSP generator tools. One example of a currently available DSP generator is known as a Transport Triggered Architecture from the Technical University of Delft. Reference can also be had to a publication entitled "Microprocessor Architectures from VLIW to TTA", by Henk Corporaal. In the user-generated DSP architectures it can be expected that techniques to optimize the use and re-use of hardware elements will also be an important consideration.

OBJECTS AND ADVANTAGES OF THE INVENTION

It is a first object and advantage of this invention to provide an improved processor architecture providing even further increases in the efficiency of resource use and functionality.

It is another object and advantage of this invention to provide an improved DSP wherein a multiplier front-end feeds at least one configurable ALU, whereby the ALU is employed for accumulating partial results during a MAC operation, and may also be used as one or more additional ALUs during non-MAC operations.

It is a further object and advantage of this invention to provide a technique to reduce or eliminate a consideration of ASIC development time-tables and scheduling in electronic product design.

It is another object and advantage of this invention to enable multiplier front end optimizations to reflect the use of ALUs as summation units for partial products generated by the multiplier front end.

SUMMARY OF THE INVENTION

The foregoing and other problems are overcome and the foregoing objects and advantages are realized by methods and apparatus in accordance with embodiments of this invention.

A data processor, preferably a DSP, includes a multiplier block having a multiplier front end for generating partial products from input operands, and further includes a plurality of ALUs having inputs that are switchably or programmably coupled, in a first mode of operation, to first data sources representing outputs of the multiplier front end. In the first mode of operation the ALUs add together partial products received from the multiplier front end to arrive at a multiplication result. In a second mode of operation the inputs of the plurality of ALUs are switchably or programmably coupled to second data sources for performing at least one of arithmetic and logical operations on data received from the second data sources. In this case the plurality of ALUs can operate together in parallel.

In general, the partial products have a width of n-bits, and a width of the ALUs is one of n-bits or less than n-bits. For example, the partial products have a width of 8-bits, and the width of the ALUs is one of 8-bits or 4-bits; or the partial products have a width of 16-bits, and the width of the ALUs is one of 16-bits, 8-bits or 4-bits; or the partial products have a width of 32-bits, and the width of the ALUs is one of 32-bits, 16-bits, 8-bits or 4-bits.

At least for the case where the width of the ALUs is less than n-bits, at least some of the plurality of ALUs are switchably or programmably coupled together to provide an n-bit wide ALU.

In the presently preferred embodiments of the DSP the plurality of ALUs can include the same or additional ALUs that are coupled to inputs of the multiplier front end for changing a sign of the input operands. Reconfigurable signal routing logic can be included for providing data paths to and from the plurality of ALUs.

In the preferred embodiment the DSP forms a part of a wireless terminal, although the teachings of this invention are not to be construed to be limited to only this one important application.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1A:
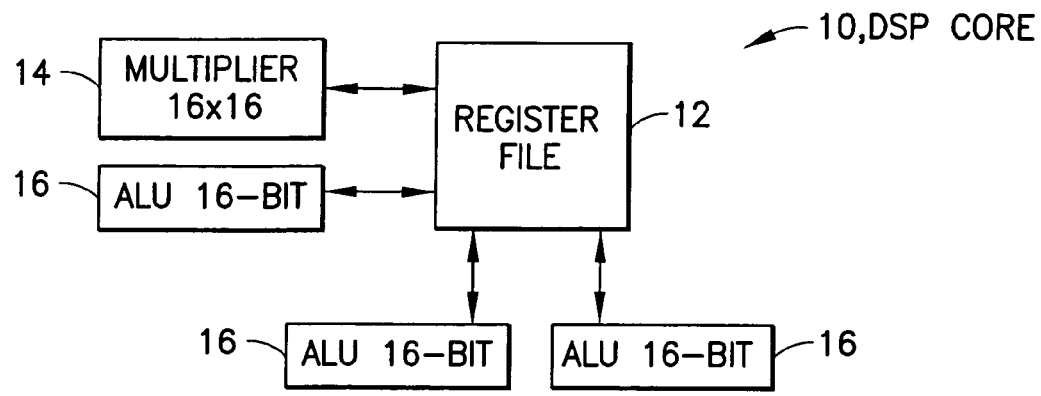
FIG. 1A is a block diagram of a basic DSP core having a register file, a multiplier, and a plurality (3) ALUs.

Reference is first made to FIG. 1A for showing a simplified block diagram of a basic DSP core 10 having a register file 12, a 16×16-bit multiplier 14, and a plurality (e.g., three) of 16-bit ALUs 16. This diagram is not intended to be read in a limiting sense, as more than one multiplier block 14 may be present, and more or less than three ALUs 16 may be used. Other circuitry will also normally be present, including an instruction decode unit and pipeline, an address generator, a barrel shifter, input/output registers and other circuitry. Furthermore, the multiplier 14 and ALUs 16 could have more or less than 16-bits of precision (e.g., they could be 32-bit devices).

Figure 1B:
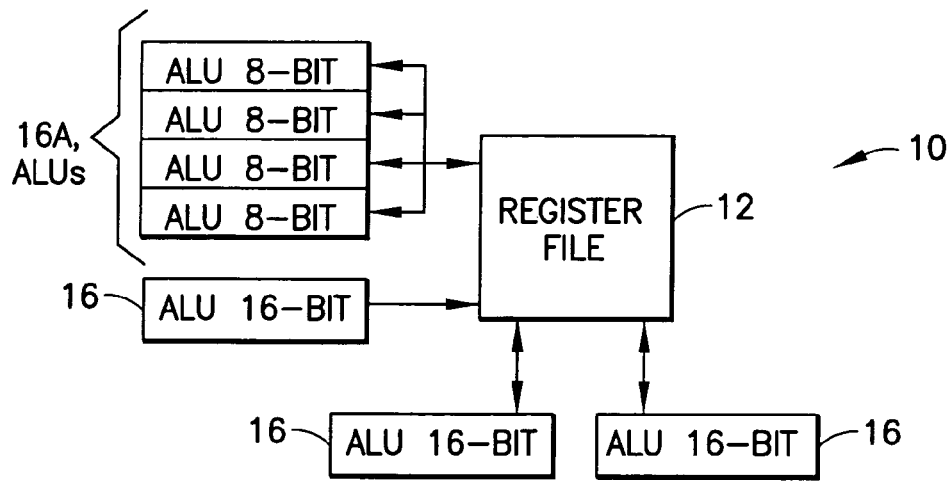
FIG. 1B is a block diagram of the DSP core of FIG. 1 when programmably reconstructed so as to provide a plurality of additional ALUs in place of the multiplier.

FIG. 1B is a block diagram of the DSP core 10 of FIG. 1 when programmably reconstructed so as to provide a plurality of additional ALUs, for example four 8-bit ALUs 16A, in place of the multiplier 14. In this embodiment the multiplier block 14 is controlled by code to function as additional ALUs, as opposed to functioning as a multiplier. This advantageously provides increased flexibility for the DSP core 10, as it is assumed that a particular processing task does not require the multiplier 14, but requires instead the additional ALUs 16A, preferably operating in parallel.

Figure 2:
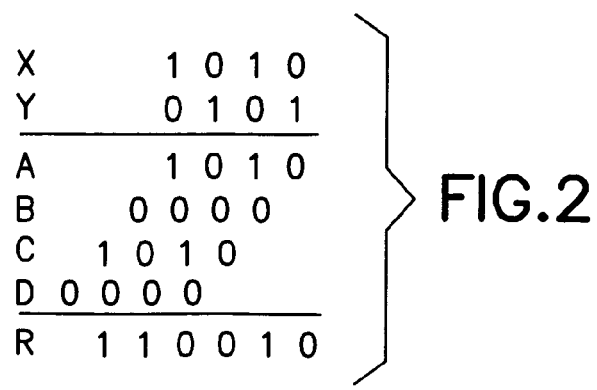
FIG. 2 is an example of a multiplication operation showing the accumulation of partial sums to achieve the products.
Figure 3:
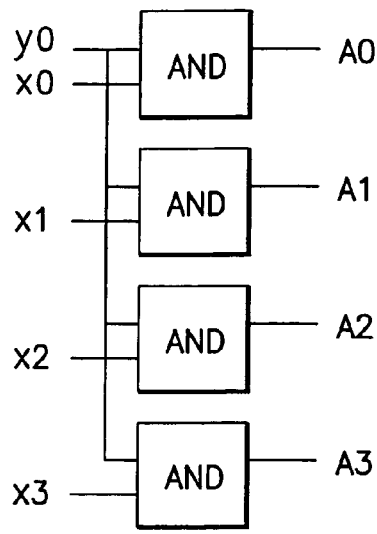
FIG. 3 depicts a plurality of AND functions for forming the partial sums of FIG. 2.
Figure 4:
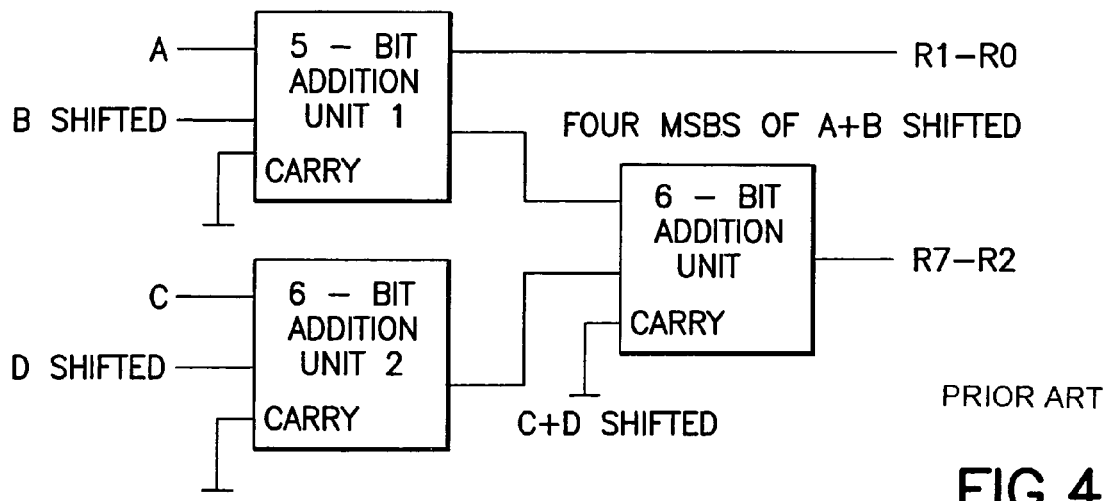
FIG. 4 shows conventional adder circuitry for summing the partials sums of FIG. 2.

In order to gain an increased understanding and appreciation for this aspect of the invention, reference is now made to FIGS. 2, 3 and 4.

FIG. 2 shows an example of a multiplication operation and the accumulation of partial sums or partial products to arrive at a final result. The traditional multiplication operation is shown for two 4-bit digital values X and Y. In order to produce the intermediate result labeled A, bit Y0 is multiplied by each of the bits of X; to produce the intermediate result labeled B, bit Y1 is multiplied by each of the bits of X, etc. The resulting four partial sums A, B, C and D (shifted) are then added together to form the final 8-bit result.

There are several ways of implementing adders and multipliers, and one example is shown in FIGS. 3 and 4. FIG. 3 depicts a plurality of AND functions for forming the partial sums of FIG. 2, wherein Y0 is ANDed with each of the bits of X to generate the 4-bit partial sum A. Not shown is an identical arrangement where Y1 is ANDed with each of the bits of X, Y2 is ANDed with each of the bits of X, etc., thereby providing the remaining partial sums of B–D.

FIG. 4 shows conventional adder circuitry for summing the partials sums of FIGS. 2 and 3. In this case there are three summation units; two 5-bit summation units and one 6-bit summation unit. The 5-bit adders produce a 5-bit wide result and a carry bit for indictaing overflow. The adder labeled as 1 calculates the sum of partial sum A and the shifted partial sum B, while the adder labeled as 2 simultaneously calculates the sum of partial sum C and the shifted partial sum D. The two least significant bits R1 and R2 of the results are obtained as a result of the operation of adder 1, while the 6-bit adder generates the remaining, most significant bits R2–R7 of the result.

In general, it is known to use various types of multiplier architectures, such as Wallace Tree and Booth multipliers. Both of these structures are optimized for multiplication, and were not developed to have general purpose functions with flexible operating modes. An in-depth treatment of the subject of multipliers can be found in "Architectures for Digital Signal Processing", by Peter Pirsch, beginning at page 94. It should thus be appreciated that the examples shown in FIGS. 2, 3 and 4 are indicative of a generic multiplication approach, that could as well be implemented using various other techniques.

Figure 5:
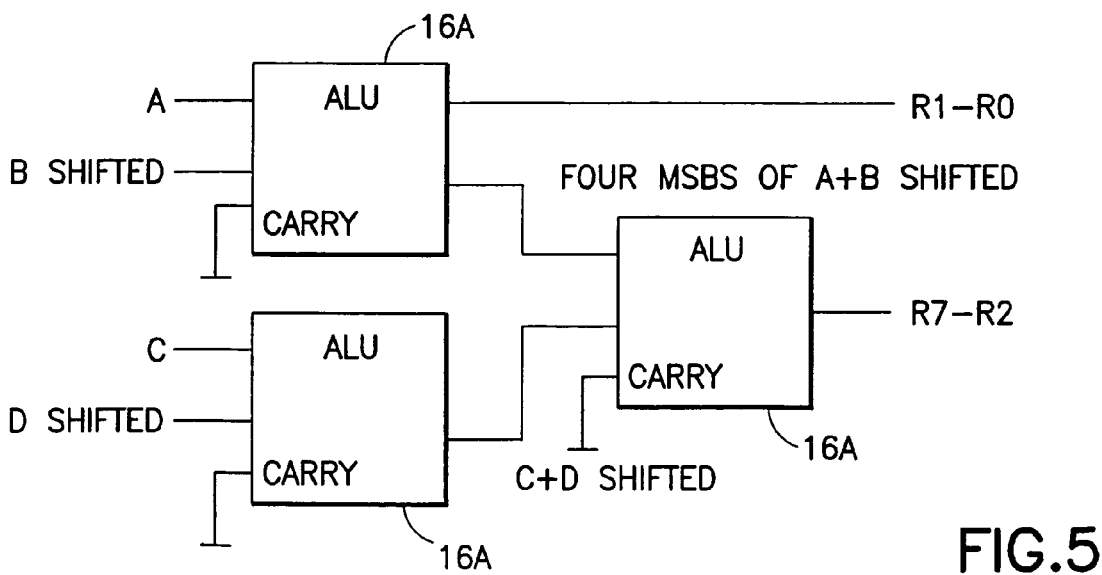
FIG. 5 depicts the circuitry of FIG. 4 where the adders are replaced with ALUs in accordance with an aspect of this invention.

FIG. 5 depicts the circuitry of FIG. 4 where the three adders are replaced with ALUs in accordance with an aspect of this invention. That is, the single function adders 1, 2 and 3 are replaced with, preferably, full function ALUs (e.g., 8-bit ALUs 16A), each of which is capable of typical ALU functionality, such as addition and subtraction, as well as logical operations such as AND, OR, XOR and bit inversion, as well as shifting or load and store operations.

When the multiplier 14 is operating in the multiplier mode the ALUs 16A are employed to add the partial sums as in the example of FIG. 4. The partial sums are output from a multiplier front-end, which may be constructed from AND gate logic as in FIG. 3. However, when operating as three 8-bit ALUs the inputs are provided instead from appropriate data buses, e.g., from two 8-bit buses. The third ALU 16A may be used to, by example, perform some desired arithmetic or logical operation of the outputs of the two 8bit ALUs, or on one of the results and another input.

In other embodiments of the ALUs 16A could be 16-bit devices, or 32-bit devices, or even wider devices.

In accordance with the teachings herein the DSP core 10 is provided with greater functionality and flexibility, as the multiplier block 14 may be programmably reconstructed to provide additional ALU support when the processing needs require same.

Figure 6:
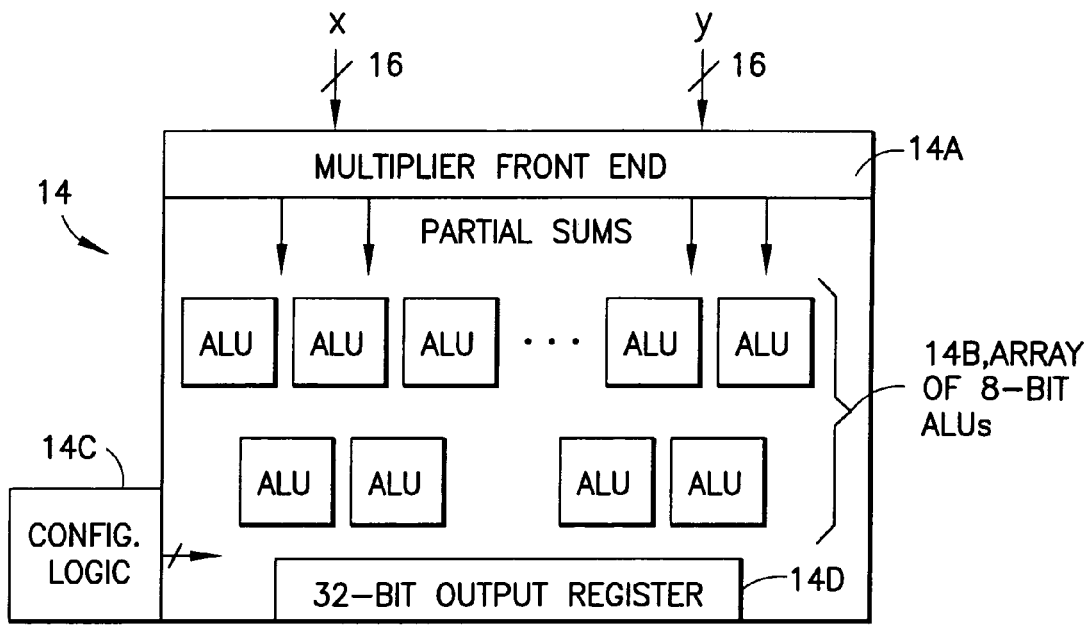
FIG. 6 illustrates an embodiment wherein a multiplier front end feeds partial sums into an array of ALUs.

FIG. 6 illustrates an embodiment of 16×16-bit multiplier 14 wherein, during a multiply operation, a multiplier front end 14A, for example the combinatorial AND logic shown in FIG. 3, feeds 16-bit partial sums into an array of 8-bit ALUs 14B. A configuration logic block 14C is driven by microcode-generated signals on an instruction-by-instruction basis to configure the multiplier block 14 as a multiplier, or to configure it as a plurality of 8-bit ALUs, or as a plurality of 16-bit ALUs, or as a plurality of 32-bit ALUs, etc. In other embodiments certain microcode fields may be applied directly to the multiplier block 14 logic to control the selection of data sources for the ALUs, as well as their connectivity, as described in further detail below.

When used as ALUs per se, and not to accumulate the partial sums during multiplication, the ALUs 14B may all be operated in parallel, or they may be chained together in a pipeline fashion with the output of one or several feeding the inputs of one or several, in order to implement various desired instruction types and processing functions. In the 16×16-bit multiplier example, a 32-bit output register 14D is provided to store the result of the multiply (or the result(s) of the ALU operations).

In a further embodiment, wherein an 8×8-bit multiply will suffice, one-half of the ALUs 14B may be used to accumulate the partials sums output from one-half of the multiplier front end 14A, while the remaining ALUs 14B may be operated in parallel as ALUs to operate on, by example, the result of the multiplication or on some other sources of data.

Figure 7:
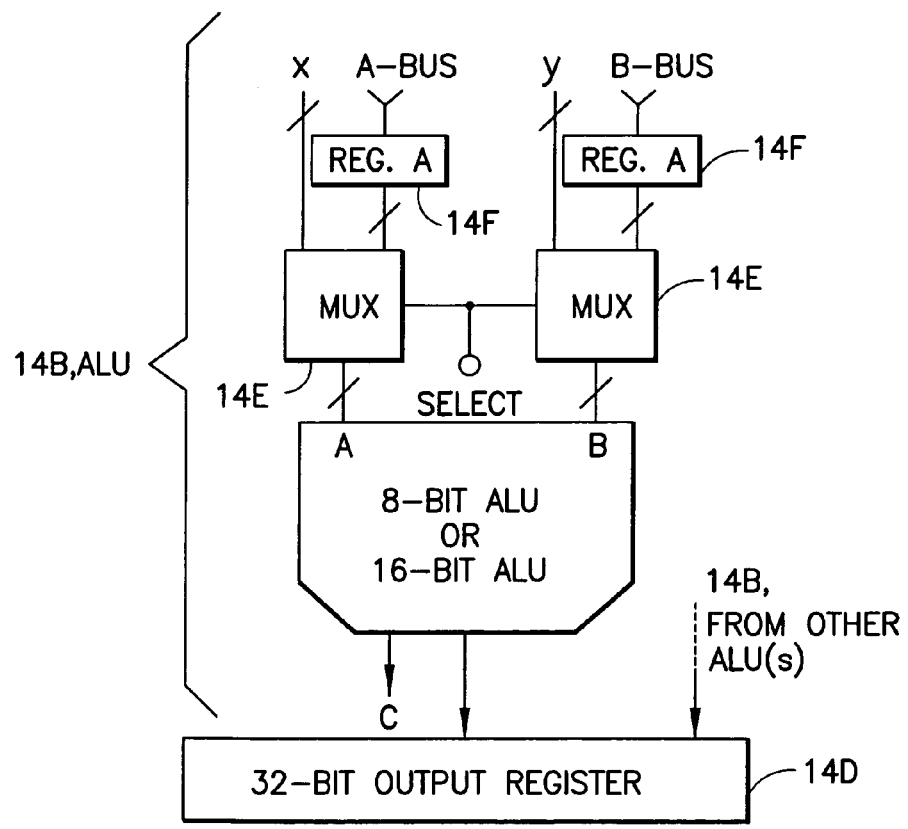
FIG. 7 illustrates in greater detail one of the ALUs of FIG. 6 and shows circuitry for multiplexing data or partial sums to the inputs of the ALU.

FIG. 7 illustrates in greater detail one of the ALUs 14B of FIG. 6. In this embodiment 8-bit multiplexers 14E are provided at the A and B ALU inputs to select, under control of the configuration logic 14C, either 8-bits of partial sum data output from the multiplier front end (or to sum the various partial sums together to arrive at the final result), or 8-bits output from 8-bit A or B input registers 14F. The inputs to the A and B registers 14F may be from DSP core 10 A and B data buses, or from some other data source(s). An ability to feedback the output of the ALU 14B to one of the input A or B registers 14F may also be provided. For the 16×16-bit multiplier case the output 32-bit register 14D is provided to receive and align the various ALU 8-bit outputs. In other embodiments, and by example, the ALUs 14B may be 4-bits in width, or they may be 16-bits in width. In this case the multiplexers 14E and the A and B registers 14F are also either 4-bit or 16-bit devices, respectively. The 32-bit output register 14D may be scalable to two 16-bit registers or four, eight bit registers.

In general, the traditional DSP routing logic may limit access to the additional processing resources provided in accordance with these teachings. One possible way to overcome this limitation is to provide additional registers and/or reconfigurable signal routing logic so that all of the additional processing resources can be fully utilized. In this regard the multiplexers 14E and the input registers 14F can be considered to form a part of reconfigurable signal routing logic for providing data paths to and from the plurality of ALUs 14B.

Figure 9A:
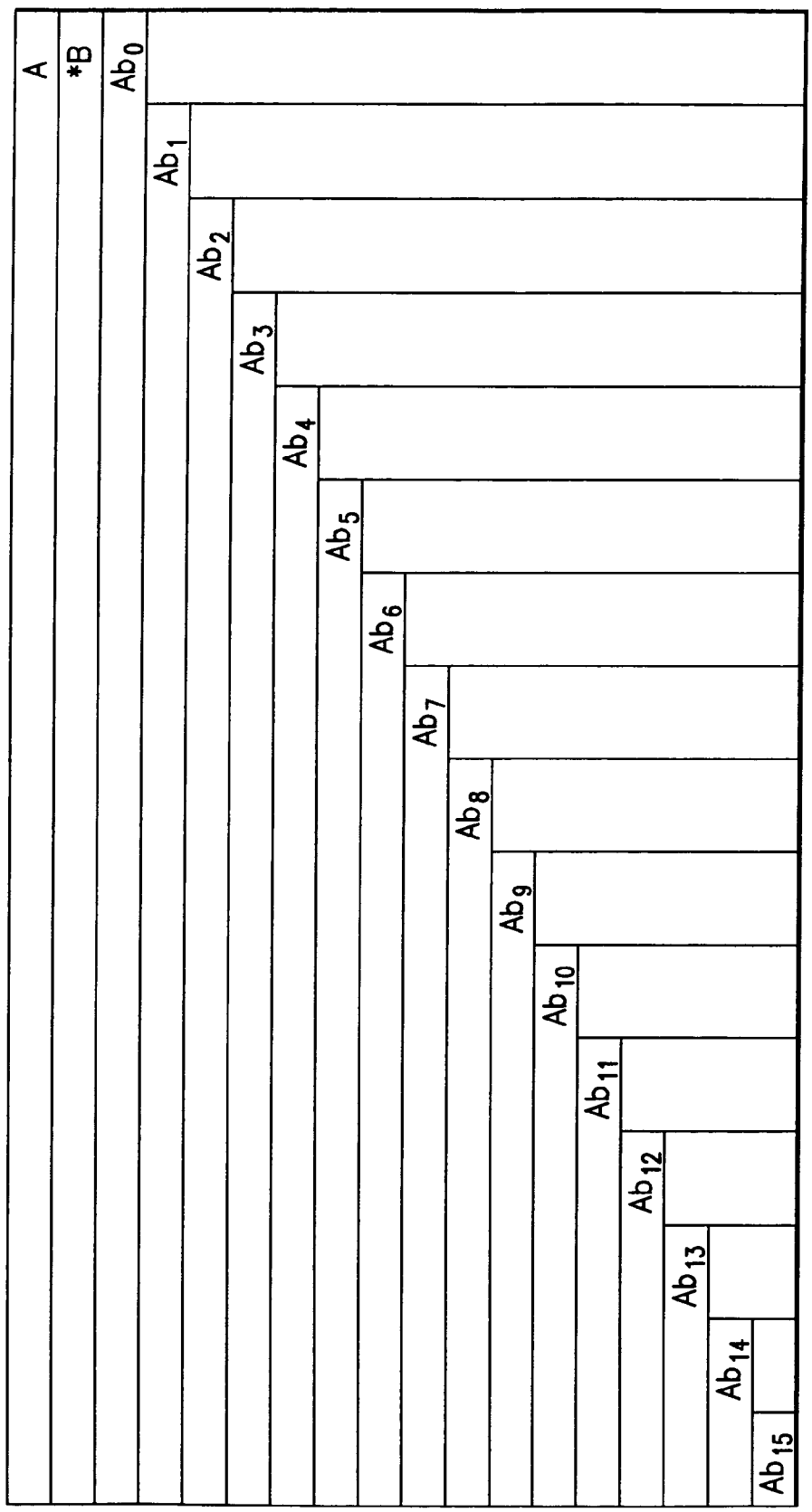
FIG. 9A depicts a table indicating partial sum values resulting from the multiplication of two, 16-bit values.
Figure 9B:
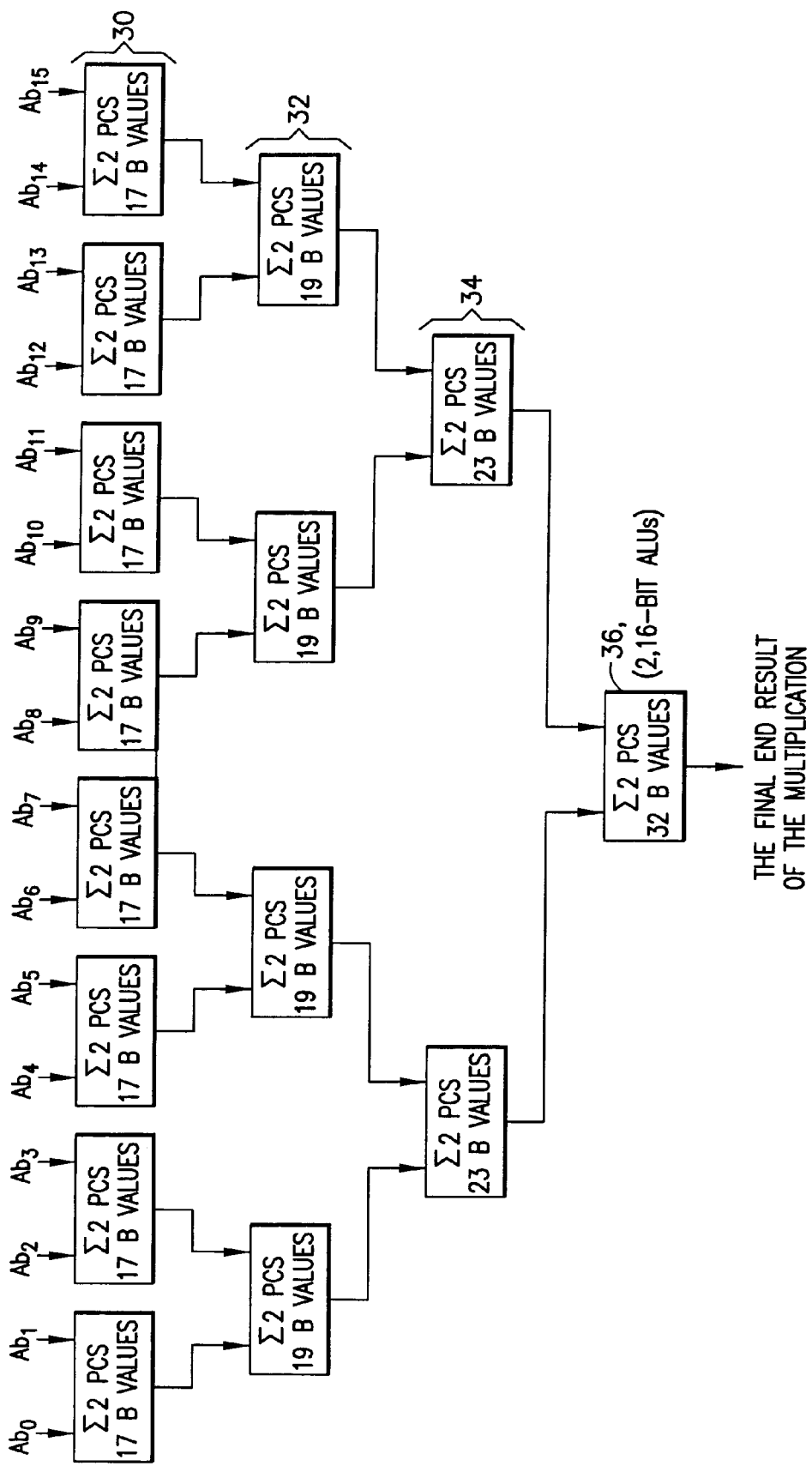
FIG. 9B shows a tree for adding the partial sum values together.

FIG. 9A shows a table indicating partial sum values resulting from the multiplication of two, 16-bit values, while FIG. 9B shows a tree for adding the partial sum values together. The multiplication of 16-bit values proceeds in a manner similar to that depicted in FIG. 2. The multiplication produces 16 partial sum values each shifted by one bit to the left (FIG. 9A). If implemented in a conventional fashion, the 16 partial sums can be added together using eight, 17-bit summation units 30, as shown in FIG. 9B. The resulting eight partial results can be added by four, 19-bit addition units 32, followed by two, 23-bit addition units 34, which feed a final 32-bit addition unit 36.

In accordance with the teachings herein the final 32-bit addition unit 36 can be implemented as two, 16-bit ALUs, which are then available as well for other processing tasks besides multiplication. In addition, techniques exist for reducing the number of remaining addition units (see, for example, Peter Pirsch: "Architectures for Digital Signal Processing"). One possible approach is use the Carry/Save/Addition principle, where it is possible to calculate together three input operands and forward the carry signal to the next stage(s). This method enables one to optimize the number of addition units. Other techniques exist for implementing the multiplier, as well as for optimizing the required hardware.

Figure 10A:
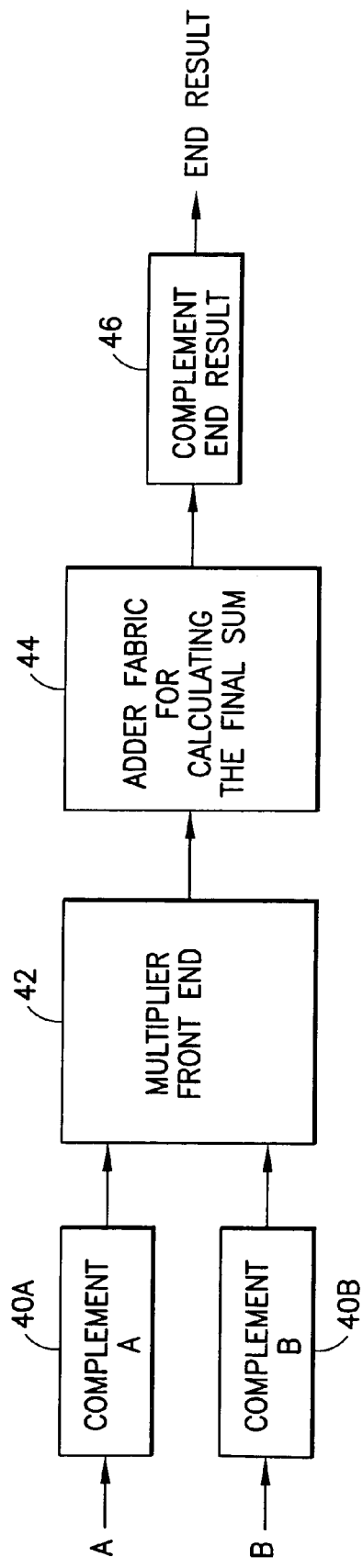
FIG. 10A is a block diagram depicting circuitry for implementing multiplication for negative values.

In practice the multiplied values of A and B can have the same sign or different signs. One practical method for implementing multiplies is shown in FIG. 10A. The values of A and B are complemented in A and B complement logic units 40A and 40B, respectively, is negative. The outputs of complement logic units 40A and 40B feed the multiplier front end 42, which then always operates on positive values. The multiplier front end feeds a partial sum adder unit 44, which is followed by complement end result logic 46 which sets the sign of the result correctly depending on the signs of A and B.

Figure 10B:
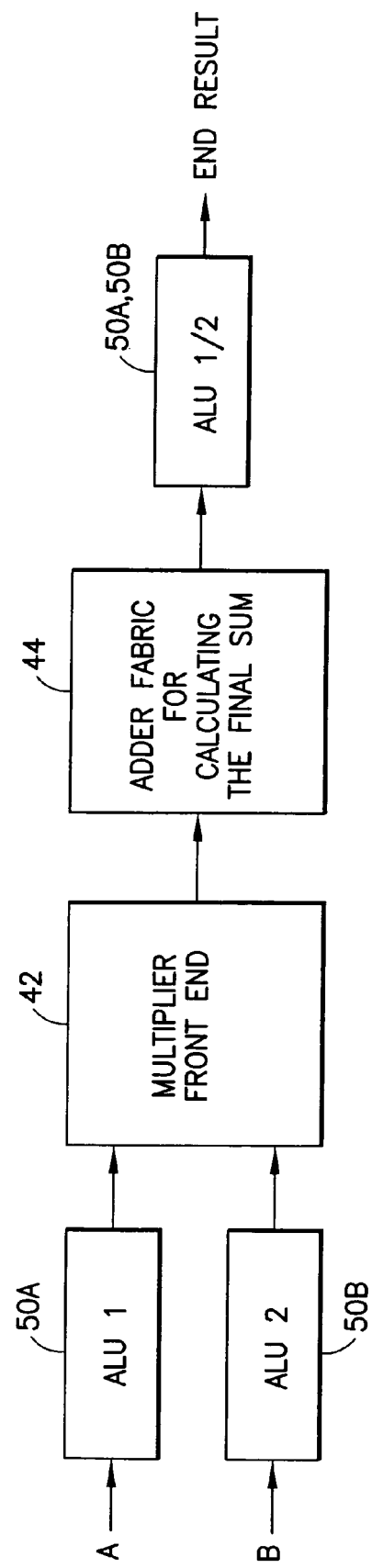
FIG. 10B is a block diagram depicting circuitry for implementing multiplication for negative values using ALUs in accordance with an aspect of this invention.

FIG. 10B depicts a technique for processing negative-valued operands in accordance with the teachings herein. In FIG. 10B it can be seen that ALUs 50A and 50B replace the complement logic units 40A and 40B, and are used to perform the complement operation during multiplication, as well as to check the end result and change the sign if necessary. The ALUs 50A and 50B can be used for other purposes at other times, such as for addition, subtraction, logical operations (for example, AND, OR, XOR, NOT) and for shifting. The ALUs 50A and 50B may also be used, as described above, to implement all or part of the adder block 44.

Figure 8:
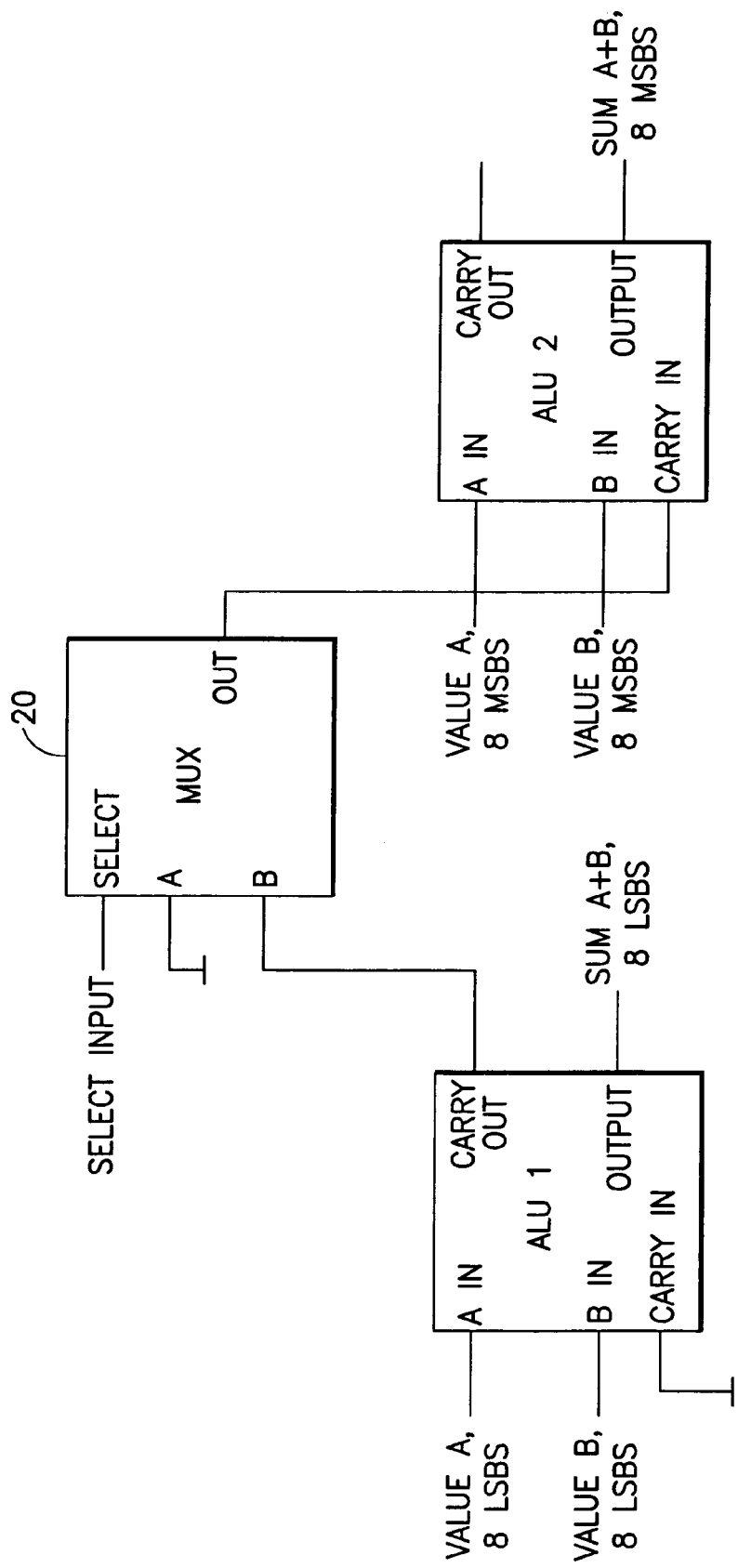
FIG. 8 illustrates one technique for chaining together two ALUs.

While described in the context of the programmably configurable multiplier block 14, it can be appreciated that other enhancements can be made as well to the DSP core 10, such as the use of chainable registers to achieve wider register widths, splittable or combinable ALUs and the like. These enhancement techniques can also be used within the multiplier block 14 itself, in addition to providing the ALUs 14B in place of the conventional dedicated adder circuitry of the prior art (see FIG. 4). By example, FIG. 8 shows one suitable technique for achieving width scaling with two ALUs, wherein a multiplexer 20 operating under control of a Select input, or a simple gate such as an AND gate, is used for chaining together the two ALUs by selectively coupling the carry out terminal of ALU 1 to the carry in terminal of ALU 2.

The use of this invention provides a number of advantages in the wireless terminal application, as different algorithms have different signal processing needs. For example, the Viterbi algorithm does not necessarily require 16-bit precision, as 8-bit precision may suffice. The use of this invention enables changes in precision in a programmable manner, and further enables the parallelism of the DSP core 10 to be changed in a dynamic manner. As an example, multiplication operations are required when performing metric calculations for the Viterbi algorithm, however for detecting the correct path through the trellis add/compare/select operations are required. The use of the teachings of this invention enables the DSP core to be programmably configured to perform the necessary multiplications, and to then be dynamically reconfigured on-the-fly to increase the number and parallelism of ALUs in order to perform the add/compare/select operations.

It is assumed that the plurality of additional ALUs 14B made possible by the use of this invention are exploited by suitable programming tools and instructions, such as by the use of C++ callable intrinsics and/or intelligent compiler design. The teachings of this invention enable improvements in the operation of certain existing instruction types, as well as an ability to define new instruction types. These teachings are furthermore applicable to a wide variety of DSP architecture types, including but not limited to superscalar architectures and very long instruction word (VLIW) architectures. The teachings of this invention can be seen to provide a "coarse-grained" programmability alternative to the relatively fixed DSP architectures and the much finer-grained programmability inherent in the use of FPGAs. The teachings of this invention also avoid the problems inherent in ASIC-based designs, as circuit changes are made rapidly under program instruction control, and can provide a more cost-effective solution than many FPGA designs. The use of this invention also enables various enhancements and optimizations to be made to the multiplier front end, so as to accommodate and work with the use of the ALU(s) at the inputs and outputs of the multiplier front end.

Thus, while the invention has been particularly shown and described with respect to preferred embodiments thereof, it will be understood by those skilled in the art that changes in form and details may be made therein without departing from the scope and spirit of the invention.

What is claimed is:

1. A data processor, comprising a multiplier block having a multiplier front end for generating partial products from input operands, and a plurality of arithmetic logic units (ALUs) having inputs switchably coupled, in a first mode of operation, to first data sources comprised of outputs of said multiplier front end for adding together partial products received therefrom to arrive at a multiplication result, said inputs of said plurality of ALUs being switchably coupled, in a second mode of operation, to second data sources for performing at least one of arithmetic and logical operations on data received from said second data sources.

2. A data processor as in claim 1, wherein said partial products have a width of n-bits, and where a width of said ALUs is one of n-bits or less than n-bits.

3. A data processor as in claim 1, wherein said partial products have a width of 8-bits, and where a width of said ALUs is one of 8-bits or 4-bits.

4. A data processor as in claim 1, wherein said partial products have a width of 16-bits, and where a width of said ALUs is one of 16-bits, 8-bits or 4-bits.

5. A data processor as in claim 1, wherein said partial products have a width of 32-bits, and where a width of said ALUs is one of 32-bits, 16-bits, 8-bits or 4-bits.

6. A data processor as in claim 1, wherein said partial products have a width of n-bits, where a width of said ALUs is less than n-bits, and where at least some of said plurality of ALUs are switchably coupled together to provide an n-bit wide ALU.

7. A data processor as in claim 1, wherein said inputs of said ALUs are switchably coupled under control of a program instruction.

8. A method of operating a data processor, comprising:
   providing a multiplier block having a multiplier front end for generating partial products from input operations; and
   providing said multiplier block with a plurality of arithmetic logic units (ALUs); wherein
   in a first mode of operation, said plurality of ALUs have inputs switchably coupled to first data sources comprised of outputs of said multiplier front end for adding together partial products received therefrom to arrive at a multiplication result; and in a second mode of operation, said inputs of said plurality of ALUs are switchably coupled to second data sources for performing at least one of arithmetic and logical operations on data received from said second data sources.

9. A method as in claim 8, wherein said partial products have a width of n-bits, and where a width of said ALUs is one of n-bits or less than n-bits.

10. A method as in claim 8, wherein said partial products have a width of 8-bits, and where a width of said ALUs is one of 8-bits or 4-bits.

11. A method as in claim 8, wherein said partial products have a width of 16-bits, and where a width of said ALUs is one of 16-bits, 8-bits or 4-bits.

12. A method as in claim 8, wherein said partial products have a width of 32-bits, and where a width of said ALUs is one of 32-bits, 16-bits, 8-bits or 4-bits.

13. A method is in claim 8, wherein said partial products have a width of n-bits, where a width of said ALUs is less than n-bits, and further comprising switchably coupling together at least some of said plurality of ALUs to provide an n-bit wide ALU.

14. A method as in claim 8, wherein said inputs of said ALUs are switchably coupled under control of a program instruction.

15. A method as in claim 8, wherein said plurality of ALUs comprise the same or additional ALUs coupled to inputs of said multiplier front end for changing a sign of said input operands.

16. A method as in claim 8, wherein switchably coupling employs reconfigurable signal routing logic.

17. A digital signal processor (DSP), comprising a DSP core having a register file, at least one arithmetic logical unit (ALU), and at least one multiplier block comprised of a multiplier front end for generating partial products from input operands, said multiplier block further comprising circuitry for adding together said partial products, said circuitry comprising a plurality of ALUs having inputs that are programmably coupled, in a first mode of operation, to first data sources comprised of outputs of said multiplier front end for adding together partial products received therefrom to arrive at a multiplication result, said inputs of said plurality of ALUs being programmably coupled, in a second mode of operation, to second data sources for selectively operating together in parallel for performing at least one of arithmetic and logical operations on data received from said second data sources, wherein said partial products have a width of n-bits, and where a width of individual ones of said plurality of ALU is one of n-bits or less than n-bits.

18. A DSP as in claim 17, wherein said plurality of ALUs comprise the same or additional ALUs that are coupled to inputs of said multiplier front end for changing a sign of said input operands.

19. A DSP as in claim 17, and further comprising reconfigurable signal routing logic for providing data paths to and from said plurality of ALUs.

* * * * *

UNITED STATES PATENT AND TRADEMARK OFFICE
CERTIFICATE OF CORRECTION

PATENT NO. : 6,959,316 B2
DATED : October 25, 2005
INVENTOR(S) : Jari A. Parviainen It is certified that error appears in the above-identified patent and that said Letters Patent is hereby corrected as shown below:

Column 8,
Line 39, after "sources" add -- , wherein said plurality of ALUs, wherein the second mode of operation, operate in parallel with one another one data received from said second data sources, and wherein said data processor forms a part of a wireless terminal --.

Column 9,
Line 8, after "sources" add -- , wherein said plurality of ALUs, wherein the second mode of operation, operate in parallel with one another one data received from said second data sources, and wherein said data processor forms a part of a wireless terminal --.

Column 10,
Line 22, delete "ALU" replace with -- ALUs --.
Line 23, after "n-bits" add -- , wherein said DSP forms a part of a wireless terminal --.

Signed and Sealed this

Seventh Day of February, 2006

JON W. DUDAS
*Director of the United States Patent and Trademark Office*